UNITED STATES PATENT OFFICE.

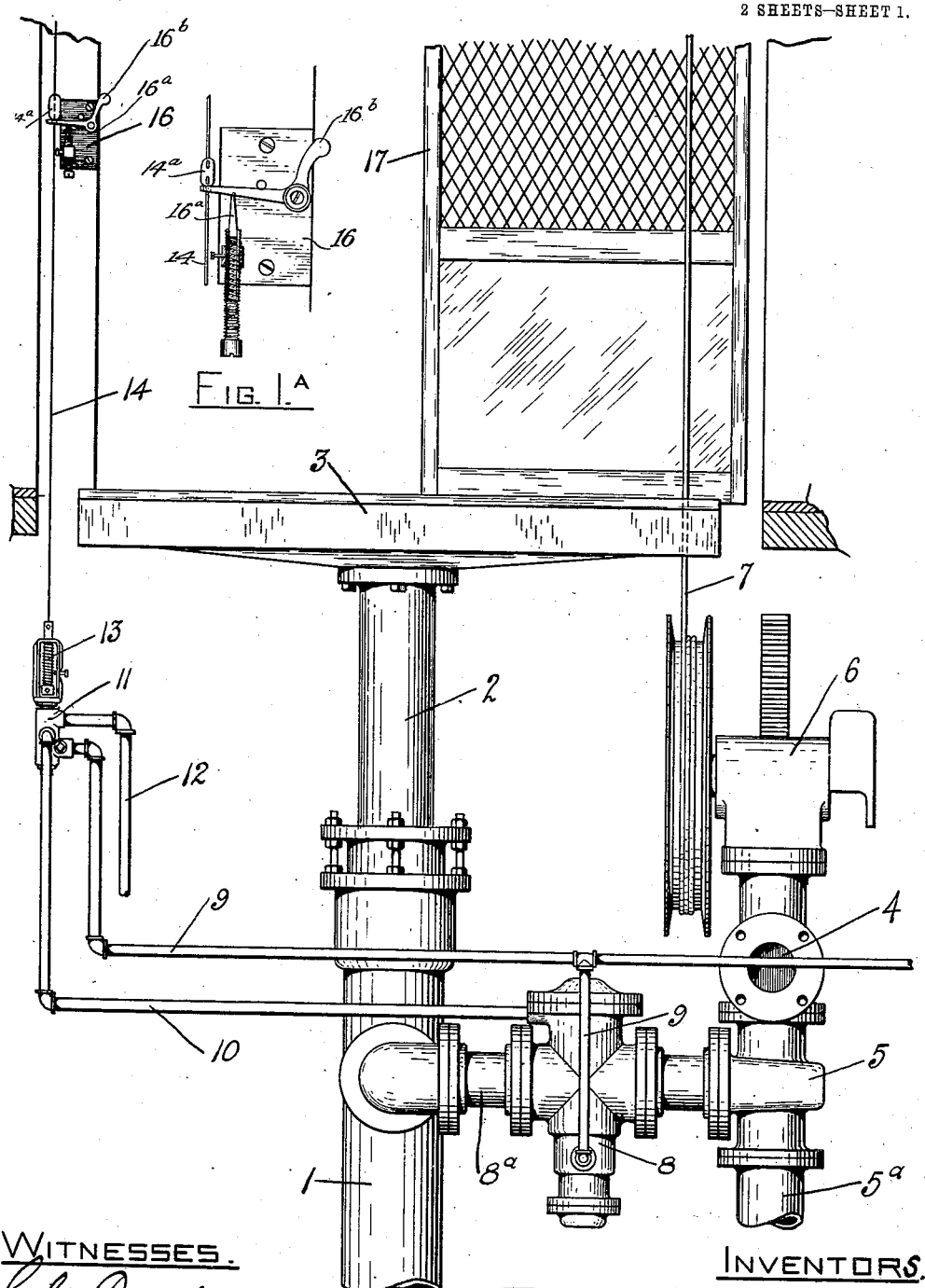

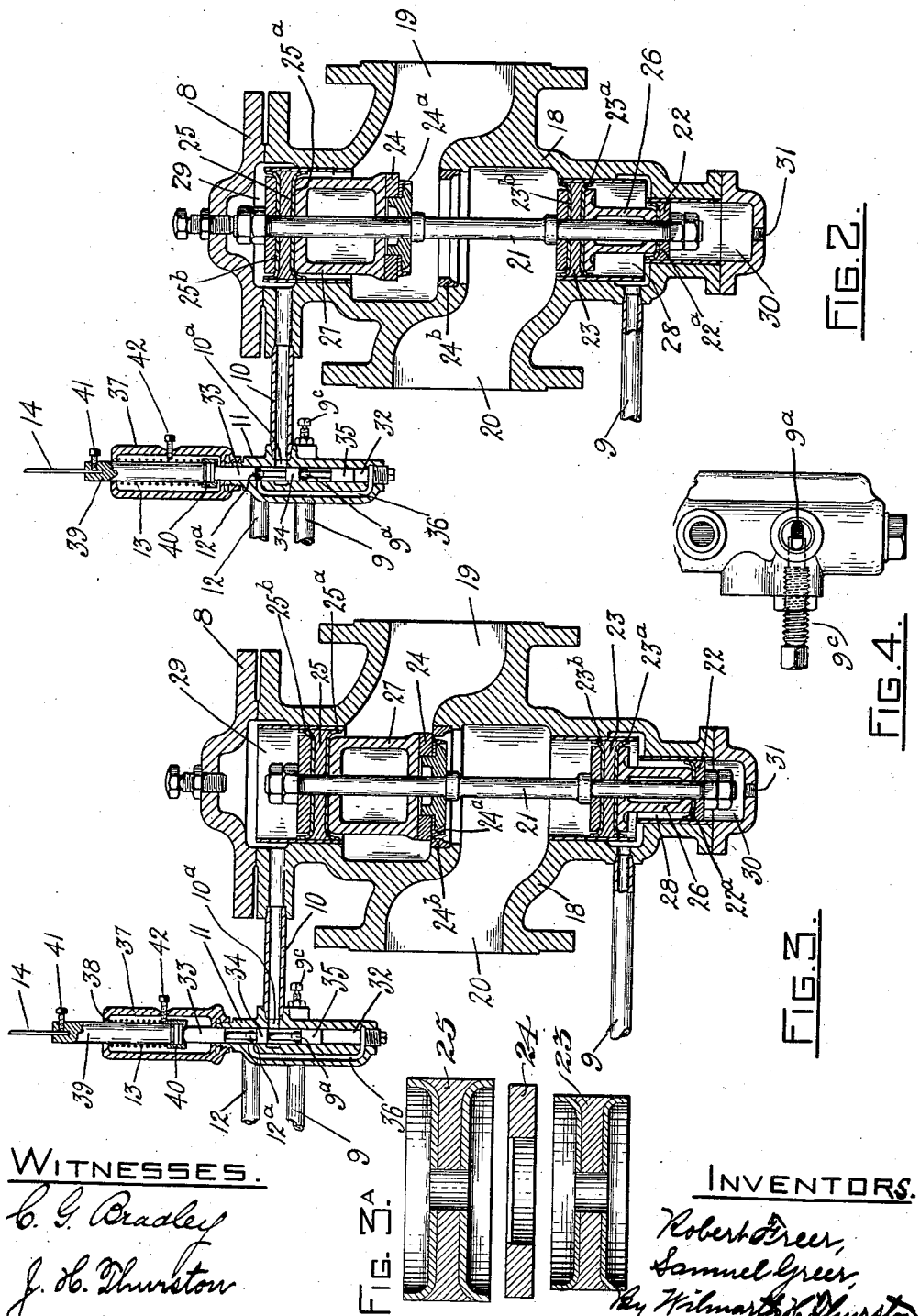

ROBERT FREER AND SAMUEL GREER, OF PROVIDENCE, RHODE ISLAND, ASSIGNORS TO SAFETY ENGINEERING COMPANY, OF PROVIDENCE, RHODE ISLAND, A CORPORATION OF RHODE ISLAND.

VALVE FOR CONTROLLING FLUID-PRESSURE.

1,083,358. Specification of Letters Patent. Patented Jan. 6, 1914.

Application filed March 9, 1907. Serial No. 361,569.

*To all whom it may concern:*

Be it known that we, ROBERT FREER and SAMUEL GREER, both of Providence, in the county of Providence and State of Rhode Island, have invented certain new and useful Improvements in Valves for Controlling Fluid-Pressure; and we do hereby declare the following specification, taken in connection with the accompanying drawings, forming a part of the same, to be a full, clear, and exact description thereof.

The invention relates to a valve for use in connection with a fluid-pressure operated machine or apparatus for the purpose of automatically cutting off or controlling the flow of the fluid pressure employed for operating such machine or apparatus.

In the accompanying drawings the invention is shown as employed in connection with a plunger-elevator for the purpose of automatically cutting off the fluid-pressure, and thus preventing the starting of the elevator whenever any one of the doors of the elevator-well is opened or moved from its closed position. The invention may, however, be employed in connection with other forms of hydraulic elevators or with other fluid-pressure operated machines, where it may be desired to automatically cut off the fluid-pressure and thus prevent the starting of the machine whenever conditions which make this desirable may arise.

The invention consists primarily of a cut-off valve adapted to be automatically operated by fluid-pressure.

The invention further consists in the combination of such valve with the fluid-pressure pipe leading to the machine to be operated whereby the operation of said valve will serve to cut off or control the flow of the fluid-pressure through said pipe.

The invention further consists of a pilot-valve or controlling valve for controlling the fluid-pressure for operating said cut-off valve, and in the combination of such pilot-valve or controlling valve with said cut-off valve.

The invention also consists in the combinations and arrangements of parts hereinafter described and claimed.

Referring to the drawings, in which, as above stated, the invention is shown as applied to a plunger-elevator, Figure 1 is an elevation of a portion of such plunger-elevator with the main operating valve and operating mechanism therefor, and showing the cut-off valve and the pilot-valve or controlling valve in combination therewith. Fig. 1ᴬ is a detail of the door-operated or controlled device. Fig. 2 is a longitudinal section on an enlarged scale through the cut-off valve and pilot-valve and showing the cut-off valve open. Fig. 3 is a similar view showing the cut-off valve closed. Fig. 3ᴬ is a detail showing the relative sizes of the pistons on a larger scale. Fig. 4 is a detail view of the pilot-valve.

Referring to Fig. 1, the cylinder for the elevator is represented at 1. 2 represents the elevator-plunger, and 3 is the elevator which for convenience is shown simply as a platform elevator, such as commonly employed for freight purposes. 4 represents the fluid-pressure supply pipe, 5 the main operating valve, 5ᵃ the exhaust-pipe therefrom, 6 the operating mechanism for said valve, and 7 the operating cable which extends up through the elevator and by means of which the main valve is operated from the elevator, all of these parts being of the usual or any desired construction. The cut-off valve 8 is located in the pipe 8ᵃ which leads from the main operating valve 5 to the cylinder 1. Said valve 8 is adapted to be operated by fluid-pressure admitted through the pipes 9 and 10. The pipe 9 connects with any suitable fluid-pressure supply, and in the arrangement shown it is connected with the lower end of the valve-casing of the valve 8, while the pipe 10 is connected with the upper end of said valve-casing. The valve 8 is a differential valve, and the fluid-pressure entering the valve-casing through the pipe 9 acts constantly upon the smaller area of said valve 8, and serves to hold said valve open at all times when the fluid-pressure through the pipe 10 is cut off. The fluid-pressure is intermittently admitted to the opposite end of the valve-casing through the pipe 10, and when so admitted acts upon the larger area of the valve 8 and so as to overcome the pressure admitted through the pipe 9 and acting upon the smaller area of said valve, and thereby move said valve to close the same, and thus cut off the fluid-pressure from the plunger-cylinder 1, even if the main operating valve 5 be open. The pipes 9 and 10 both communicate with the valve-casing of the pilot-valve 11, from which casing also extends an exhaust pipe 12. The pilot-valve 11 is provided with a spring 13 which normally holds said valve 11 in a position to cut off the passage of the fluid-pressure through said valve and thus to cut off the passage of the fluid-pressure through the pipe 10 and from the larger area of the valve 8.

Connected to the valve-stem of the controlling-valve 11 is a cable or wire 14 which extends to the top of the elevator-well and has its upper end secured to the ceiling or to some fixed part (not shown). Secured to the jamb of each of the doors of the elevator-well is a device 16 adapted to be operated or controlled by the door in opening and closing, said device 16 in turn serving through the cable 14 to operate or control the pilot-valve 11. The construction and operation of said device 16 and its combination with the other parts forms the subject of another application of even date herewith Serial No. 361,570 and need not herein be described in detail. It will be sufficient to state that said device embodies a spring-pressed plunger $16^a$ arranged to act upon the pivoted lever $16^b$, which lever in turn acts upon a block $14^a$ secured to the cable 14, and that the construction and arrangement are such that when the door 17 of the elevator-well is opened or moved from its closed position, the wire 14 will be raised by the action of the spring-pressed plunger $16^a$ so as to open the pilot-valve 11 to permit the flow of the fluid-pressure through said valve and through the pipe 10 to the valve-casing of the valve 8 to act upon the larger area of said valve, and further that the raising of the wire 14 serves to put the spring 13 under tension, and so that when the door is again closed the spring 13 will act to close the pilot-valve 11 to cut off the flow of the fluid-pressure through the pipe 10, said spring 13 being permitted thus to act through the intermediate operation of the device 16.

The construction of the cut-off valve 8 will be next described. Referring to Figs. 2 and 3, the cut-off valve 8 comprises a suitable casing 18 provided with an inlet-port 19 adapted to be connected with the fluid-pressure supply, and with an outlet-port 20 adapted to be connected with the fluid-pressure mechanism for operating the machine, in the present case with the cylinder 1 of the elevator-plunger. Said cut-off valve comprises a valve-stem 21 to which are connected a series of valves or pistons 22, 23, 24, 25. Of these several valves or pistons the valve 24 is the main cut-off valve, which serves to control the passage through the valve-casing leading from the inlet-port 19 to the outlet-port 20, while the other valves or pistons are for the purpose of controlling the operation of said valve 24. The valve 22 is preferably provided with a cup-packing $22^a$, while the valve 23 is provided with two cup-packings $23^a$ and $23^b$ facing in opposite directions, and the valve 25 is likewise provided with two cup-packings $25^a$ and $25^b$ facing in opposite directions. Secured to the valve 24 is a ring $24^a$ preferably made of bronze, adapted to enter within the valve-seat $24^b$. The valve 24 is a puppet-valve adapted to seat against the valve-seat $24^b$. The ring $24^a$ is preferably made slightly tapering and so as to constitute a choking device for gradually cutting off the flow of the fluid-pressure. A distance-piece 26 is secured to the valve-stem 21 between the valves 22 and 23, and a distance-piece 27 is likewise secured to said valve-stem between the valve 24 and the valve 25.

If desired the valves 23, 24 and 25 may all be of the same diameter. It is preferred, however, to make the valve 23 of slightly less diameter than the valve 24, and to likewise make the valve 24 of slightly less diameter than the valve 25, as thereby all of said valves may be secured to the valve-stem 21, and the combined valve-structure may be inserted in or removed from the valve-casing from one end of said casing, viz., the upper end, as shown in the drawings. With such construction the valve 23 may be readily passed through the valve-seat for the valve 24, while the valve 24 may be readily passed through the chamber of the valve 25. It will be noted that the valve 24 is the only one of the four valves which seats against a valve-seat, the other valves being piston-valves. The making of the valves 23, 24 and 25 of somewhat different diameters also serves a useful purpose in the operation of the valve, as will be hereinafter explained.

By means of the several valves or pistons referred to the valve-casing is divided into a series of chambers. With one of these chambers 28 near the lower end of the valve-casing the pipe 9 communicates, while with another chamber 29 at the upper end of said valve-casing the pipe 10 leading from the pilot-valve 11 communicates. At the lower end of the valve-casing when arranged as shown there is another chamber 30 which is open to the atmosphere through the opening 31.

The construction of the pilot-valve 11 will next be described. Said pilot-valve comprises a valve-casing 32 provided with suitable ports $9^a$, $10^a$ and $12^a$ with which the pipes 9, 10 and 12 respectively communicate. Said pilot-valve comprises a valve-stem 33 which is reduced in diameter at two different places, so as to form the valves 34 and 35. The valve 34 is the main controlling-valve which controls the three ports 9ª, 10ª and 12ª and the passage of the fluid-pressure therethrough, the valve 35 merely serving to prevent the escape of the fluid-pressure from the lower end of the valve-casing through the by-pass 36 which connects the lower end of said valve-casing with the exhaust-port 12ª. The upper enlargement of the valve-stem 33 serves to prevent the escape of the fluid-pressure through the upper end of the valve-casing.

It is preferred for a purpose to be hereinafter described to make the inlet-port 9ª elongated, as shown in Fig. 4, and to provide means, such as an adjusting screw 9ᶜ, for regulating the size of said inlet-port.

The valve-stem 33 is extended upward through the valve-casing as shown. Secured to the upper end of the valve-casing is a yoke 37 having an opening 38, through which a rod 39 is arranged to slide. Said rod 39 is provided at its lower end with a collar 40, by means of which a swivel connection is made between the lower end of said rod 39 and the upper end of the valve-stem 33. To the upper end of the sliding rod 39 the cable or wire 14 is connected by means of a set screw 41, or in any suitable manner. A screw or pin 42 is passed through one side of the yoke 37, the inner end of said pin lying in the path of the collar 40 and serving to limit the upward movement of the rod 39 and the valve-stem 33.

One end of the spring 13 abuts against the cross-piece of the yoke 37, while the other end of the spring abuts against the collar 40, as shown.

The operation of the parts above described is as follows: Assuming the cut-off valve to be open, and with the parts in the position shown in Fig. 2, it will be understood that the fluid-pressure which enters through the pipe 9 is present in the chamber 28, and is thus constantly acting upon the valve 22 and the lower side of the valve 23. By reason of the fact that the valve 23 is of considerably greater diameter than the valve 22, the fluid-pressure in said chamber 28 acting upon the differential area of the valve 23 will serve to hold the parts in the position shown in Fig. 2, that is, with the cut-off valve 24 open. It will be understood that the parts will remain in this position as long as all the doors of the elevator-well remain closed, and so that the passage from the main operating valve 5 to the plunger-cylinder 1 will remain open, and so that the elevator may be started and operated. When now any one of the doors of the elevator-well is opened or moved from its closed position, as shown in Fig. 1, the device 16 will operate to raise the wire 14, and thereby operate the pilot-valve 11 against the action of the spring 13, and to so change the positions of the valve 34 as to permit the fluid-pressure from the pipe 9 to flow through said pilot-valve 11 and to the pipe 10. Thus referring to Figs. 2 and 3, it will be seen that with the cut-off valve 24 open, as shown in Fig. 2, the controlling valve 34 of the pilot-valve 11 is in a position to open communication between the port 10ª and the exhaust port 12ª and so that the chamber 29 will be open to the atmosphere through the exhaust pipe 12. When now the controlling valve 34 is moved upward by the device 16 into the position shown in Fig. 3, it will be seen that communication between the port 10ª and the port 12ª has, by said movement of the valve 34, been cut off by said valve, and that by said movement of the valve 34 communication has been opened between the port 10ª and the port 9ª and so that the fluid-pressure from the pipe 9 can flow to the pipe 10 and to the chamber 29.

The purpose of the by-pass 36 is to take care of any leakage past the valve 35. Thus without said by-pass leakage past the valve 35 might result in building up a pressure in the lower end of the valve-casing below said valve 35 which would affect the operation of the valve-structure. This is prevented by the by-pass 36 which connects the lower end of the valve-casing with the exhaust port 12ª.

The fluid-pressure, which by the movement of the valve 34 is caused to flow through the pipe 10, enters the chamber 29 of the cut-off valve, and so as to act upon the upper side of the valve 25. It will be understood that the valves 23 and 24, even if of slightly different diameter, will be so nearly balanced, under the action on said valves of the fluid-pressure flowing from the port 19 to the port 20, that the action of the fluid-pressure on the upper side of the valve 23 and the lower side of the valve 24 may be ignored in considering the operation of closing the cut-off valve. So also the action of the fluid-pressure on the upper side of the valve 24 and the underside of the valve 25 may likewise be ignored, and there remains to be considered only the action of the fluid-pressure upon the underside of the valve 23 and the upper side of the valve 25.

The fluid-pressure acting upon the underside of the valve 23 is partially balanced by the action of said pressure upon the upper side of the valve 22, and is thus effective only upon the annular differential area of the valve 23. Consequently only the corresponding annular area of the upper side of the valve 25 will be balanced by the effective pressure upon the underside of the valve 23. The fluid-pressure, therefore, which enters the chamber 29 and acts upon the upper side of the valve 25 will be effective upon the central unbalanced area of said valve 25 to move the entire valve-structure downward or in a direction to close the valve 24.

In order to prevent the jar or shock which would be incident to a sudden cutting off of the power and a sudden stopping of the elevator, it is preferred to gradually cut off the flow of the fluid-pressure from the port 19 to the port 20. This is effected by making the ring 24ª slightly tapering, and so that when the lower end of said ring enters the valve-seat 24ᵇ, the fluid-pressure will be only partially cut off and so that the cutting off of said fluid-pressure will be gradually effected by the continued downward movement of the ring 24ª, until the valve 24 is finally brought to its seat. When now the door of the elevator-well, which has been opened, is closed, it will act upon the device 16 so as to permit the pilot-valve 11 to be moved in the opposite direction by the action of its spring 13. Such movement of the pilot-valve will serve to close the port which communicates with the pipe 10, and to open the port which communicates with the exhaust pipe 12. The result of this will be to relieve the pressure in the pipe 10 and in the chamber 29, and thus to relieve the pressure upon the upper side of the valve 25. The pressure in the chamber 28, which as above stated is constantly present in said chamber, will then act upon the differential area of the valve 23, and so as to move said valve, together with the valve-stem 21 and the other valves or pistons connected thereto, upward or in a direction to open the cut-off valve 24 and open the passage from the port 19 to the port 20. The fluid-pressure will then be free to flow from the main operating valve 5 to the plunger-cylinder, and the elevator may now be started and operated by means of said main valve and the operating cable 7.

As will be seen, a characteristic feature of the cut-off valve above described is that the fluid-pressure is constantly present in the chamber 28, but is intermittently admitted to the chamber 29, the chamber 30 being open to the atmosphere. It will be further seen that when the fluid-pressure is thus intermittently admitted to the chamber 29, it there acts upon a differential area to move the compound valve-structure in a direction to close the cut-off valve 24, and that when the fluid-pressure in the chamber 29 is released, the fluid-pressure in the chamber 28 will act upon the differential area of the valve 23 to move the compound valve-structure in the opposite direction to open the cut-off valve 24. It will be further seen that the intermittent admission of the fluid-pressure into the chamber 29 is controlled by the door of the elevator-well through the pilot-valve or controlling-valve 11. That is, the admission of the fluid-pressure into the chamber 29 is controlled by the pilot-valve 11, and said pilot-valve is in turn controlled by the elevator-door, the arrangement being such that so long as all the doors of the elevator-well remain closed the fluid-pressure will be excluded from the chamber 29, and the cut-off valve 24 will remain open. When, however, any one of said doors is moved from its closed position, the fluid-pressure will be admitted to said chamber 29, and will operate to close the valve 24 and so as to cut-off the power and prevent the elevator from being started, and further that said elevator cannot be started until said door is closed.

In addition to facilitating the introduction of the combined valve-structure of the cut-off valve within the valve-casing, a further and operative advantage results from making the valves 23, 24 and 25 of slightly different diameters. Ordinarily, as above explained, when the fluid-pressure has been released from the chamber 29, the combined valve-structure is moved in a direction to open the cut-off valve 24 by the fluid-pressure which is constantly present in the chamber 28 acting on the differential area of the valve 23, as compared with the area of the valve 22. If, however, for any reason the fluid-pressure should be accidentally cut off from the chamber 28, and if the valves 23, 24 and 25 were all of the same diameter, there would be no means for opening the valve 24, and said valve would remain closed. With the valves 23, 24 and 25 made of slightly different diameters, however, the valve 24 has a differential area as compared with the valve 23, and the valve 25 has a differential area as compared with the valve 24, and these differential areas constitute means for opening the valve 24, if for any reason the necessary fluid-pressure is accidentally not present in the chamber 28. Thus with the cut-off valve structure 8 in the position shown in the drawings, and in which the flow of the fluid-pressure through said cut-off valve is from the port 19 to the port 20, as above described, then when the main operating valve 5 is opened the fluid-pressure entering through the port 19 will act upon the differential area of the valve 25 and will thus serve to move the combined valve-structure in a direction to open the valve 24. If, on the other hand, the cut-off valve 8 be reversed in position, and so that the port 20 becomes the inlet-port and the port 19 becomes the outlet-port, as is frequently done in practice, then whenever the main operating valve 5 is opened the fluid-pressure entering through the port 20 will act upon the differential area of the valve 24 and will thus serve to move the combined valve-structure in a direction to open said valve 24, even if there be no fluid-pressure present in the chamber 28.

In addition to providing means in the form of the tapering ring 24ª for effecting the cutting off of the fluid-pressure, it is desirable to provide means for regulating the time occupied by the valve 24 in closing. If the elevator is a fast running elevator, the cut-off valve should be closed more slowly than if the elevator be a slow running elevator, and for the reason that if the elevator be a fast running one it would be objectionable and very likely injurious to close the cut-off valve too quickly. By making the inlet-port 9ª of the pilot-valve elongated, and providing the adjusting-screw 9ᶜ, the time required for the closing of the cut-off valve 24 may be regulated by regulating or adjusting the size of said inlet-port by means of said adjusting-screw. By reducing the size of said inlet-port the quantity of fluid allowed to pass through the pipe 10 and into the chamber 29 in a given period of time will be correspondingly reduced, but without effecting the pressure, and consequently the time required to move the compound valve-structure a given distance will be correspondingly increased. Thus by regulating the size of the inlet-port 9ª the time to be occupied by the valve 24 in closing may be varied and regulated according to the speed of the elevator in connection with which the apparatus is to be used. While means are thus provided for regulating the time occupied by the cut-off valve 24 in closing, it is desirable that the port 10ª shall remain at all times free and wholly unobstructed, in order that there may always be a full and free escape through said port of the fluid-pressure from the chamber 29 whenever the valve 34 is moved to put said port 10ª into communication with the exhaust-port 12ª and so that the cut-off valve 24 will always be quickly opened.

While the cut-off valve 8 is shown in the drawings as located between the main operating valve 5 and the plunger-cylinder 1, said cut-off valve may, if desired, be located on the opposite side of said operating valve, that is, between the fluid-pressure supply and said operating valve.

In the drawings the cut-off valve 8 is shown as arranged in a vertical position and with the valve 25 uppermost, and so that the combined valve-structure, comprising the valve-stem 21 with the several valves or pistons secured thereto, moves in a vertical direction in opening or closing, and moves downward to close the valve 24 and upward to open the same. It will be understood, however, that said cut-off valve 8 may, if desired, be reversed in position vertically, or may be arranged horizontally, and so that the compound valve-structure will move in a horizontal, instead of in a vertical, direction. It will be further understood that the construction and arrangement of the several parts may be varied without departing from the main features of the invention.

What we claim as our invention and desire to secure by Letters Patent is:

1. The combination, with an elevator-car, of mechanism for operating said car, a main valve for controlling said operating mechanism, and a cut-off valve for cutting off the fluid pressure from said operating mechanism, said cut-off valve being provided with differential pistons for operating the same.

2. The combination, with an elevator-car, of mechanism for operating said car, a main valve for controlling said operating mechanism, a cut-off valve for cutting off the fluid pressure from said operating mechanism, and differential pistons for operating said cut-off valve, one of said pistons being constantly subjected to fluid pressure, and the other piston being subjected to fluid pressure intermittently.

3. The combination, with an elevator-car, of mechanism for operating said car, a main valve for controlling said operating mechanism, a cut-off valve for cutting off the fluid pressure from said operating mechanism, differential pistons for operating said cut-off valve, means for applying fluid pressure constantly to one of said pistons, and means for applying fluid pressure intermittently to the other piston.

4. The combination, with an elevator-car, of mechanism for operating said car, a main valve for controlling said operating mechanism, a cut-off valve for cutting off the fluid pressure from said operating mechanism, differential pistons for operating said cut-off valve, means for applying fluid pressure constantly to one of said pistons, and a pilot-valve for controlling the admission of fluid pressure intermittently to act upon the other piston.

5. The combination, with an elevator-car, of mechanism for operating said car, a main valve for controlling said operating mechanism, a cut-off valve for cutting off the fluid pressure from said operating mechanism, differential pistons for operating said cut-off valve, means for applying fluid pressure constantly to one of said pistons, a pilot-valve for controlling the admission of fluid pressure intermittently to act upon the other piston, and a cable for controlling the operation of said pilot-valve.

6. A valve structure having a casing provided with inlet and outlet ports, a cut-off valve for controlling the passage between said ports, differential pistons for operating said cut-off valve, two chambers for the admission of fluid pressure to act on said differential pistons, and a third chamber open to the atmosphere, with a third piston in said chamber.

7. The combination, with a valve casing provided with inlet and outlet ports, of a cut-off valve for controlling the passage between said ports, differential pistons for operating said cut-off valve, a chamber for each of said differential pistons, means for providing a constant fluid pressure in one of said chambers, and an intermittent fluid pressure in the other chamber, and a third chamber open to the atmosphere, with a third piston in said chamber.

8. The combination, with a valve casing provided with inlet and outlet ports, of a cut-off valve for controlling the passage between said ports, two differential pistons for operating said cut-off valve, and three chambers in said casing, one chamber for each of said differential pistons and adapted to receive fluid pressure to act thereon, and the third chamber being open to the atmosphere, and containing a third piston.

9. The combination, with a valve-casing provided with inlet and outlet ports, of a cut-off valve for controlling the passage between said ports, means operated by fluid pressure for opening and closing said cut-off valve, and means whereby when the fluid pressure for opening said valve fails, said valve will be opened by the introduction of fluid pressure through said inlet-port.

ROBERT FREER.
SAMUEL GREER.

Witnesses:
W. H. THURSTON,
J. H. THURSTON.

Copies of this patent may be obtained for five cents each, by addressing the "Commissioner of Patents, Washington, D. C."